T. H. BURRIDGE.
BRICK-MACHINE.

No. 171,095.

3 Sheets—Sheet 1.

Patented Dec. 14, 1875.

ATTEST.
Robt Burns
Chas J Gooch

INVENTOR.
Thomas H. Burridge
By Knight Bro.
Attys.

T. H. BURRIDGE.
BRICK-MACHINE.

No. 171,095. Patented Dec. 14, 1875.

ATTEST.
Robt Burns
Chas. J. Gooch

INVENTOR
Thomas H. Burridge
By Knight Bro.
Attys

T. H. BURRIDGE.
BRICK-MACHINE.

No. 171,095.

3 Sheets—Sheet 3.

Patented Dec. 14, 1875.

ATTEST:
Robt. Burns
Chas J. Gooch

INVENTOR.
Thomas H. Burridge
By Knight Bro.
Attys.

UNITED STATES PATENT OFFICE.

THOMAS H. BURRIDGE, OF ST. LOUIS, MO., ASSIGNOR OF TWO-THIRDS HIS RIGHT TO WILLIAM H. SWIFT AND JEREMIAH FRUIN, OF SAME PLACE.

IMPROVEMENT IN BRICK-MACHINES.

Specification forming part of Letters Patent No. 171,095, dated December 14, 1875; application filed July 26, 1875.

*To all whom it may concern:*

Be it known that I, THOMAS H. BURRIDGE, of the city and county of St. Louis, State of Missouri, have invented a new and useful Improvement in Brick-Machines, of which the following is a specification:

The first part of my improvement consists in the process of molding the bricks by compressing the clay into the molds by hammers or plungers varying in face area, and arranged in a series, so that each mold passes first beneath the smallest hammer, and so on to the largest.

The second part consists in the combination of such series of hammers, intermittently-moving molds, and trough whose bottom forms the bottoms of the molds while filling.

The third part of my improvement consists in the combination of a feed-block, operating levers provided with shoes, and mold-chain, having joint-rods provided with projecting ends, adapted to engage with the levers for imparting forward movement to the feed-block, and a spring for retracting said feed-block, as explained.

The fourth part consists in the mechanism for giving intermittent motion to the molds.

Figure 1:
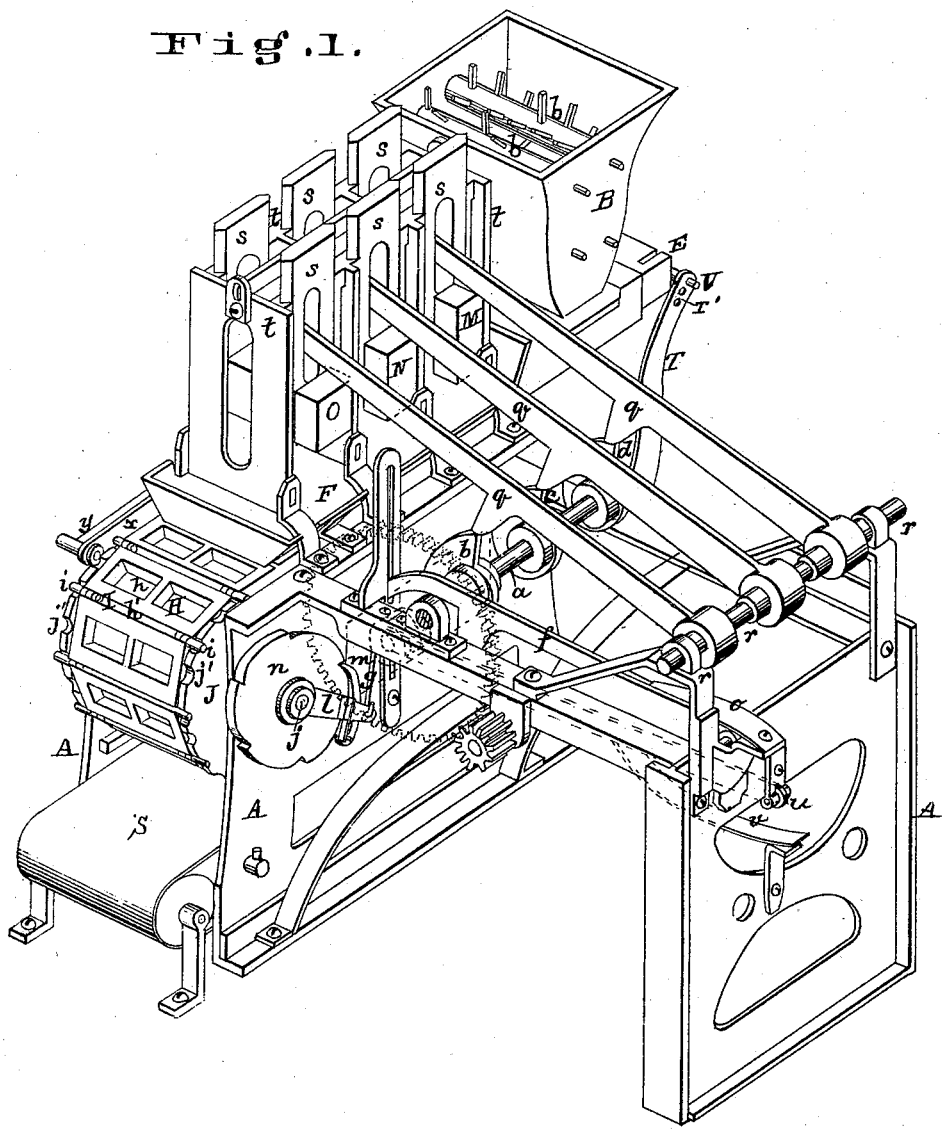
Figure 2:
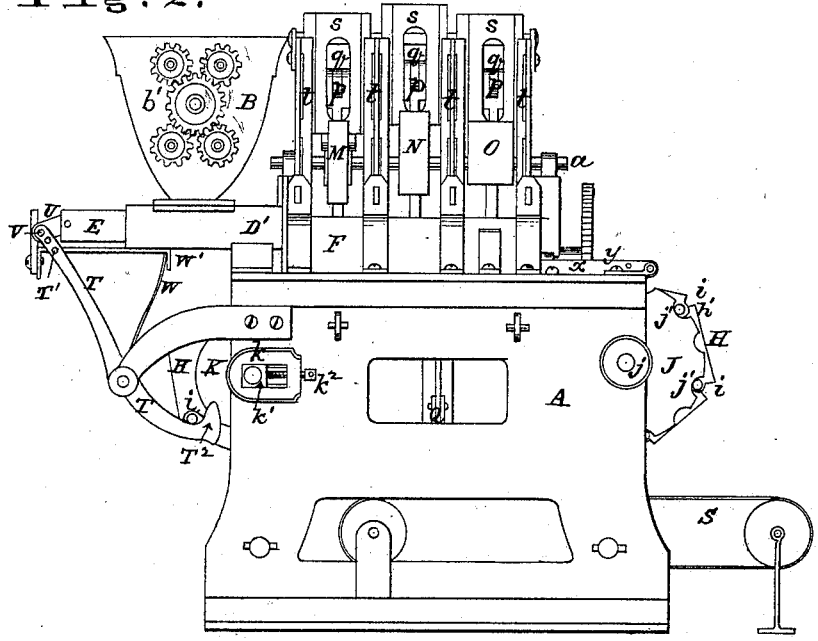
Figure 3:
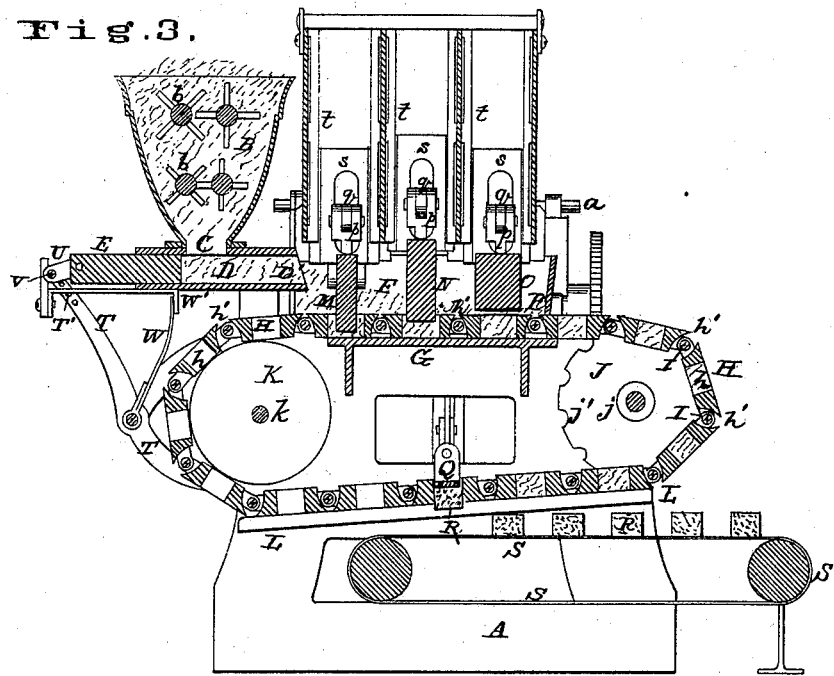
Figure 4:
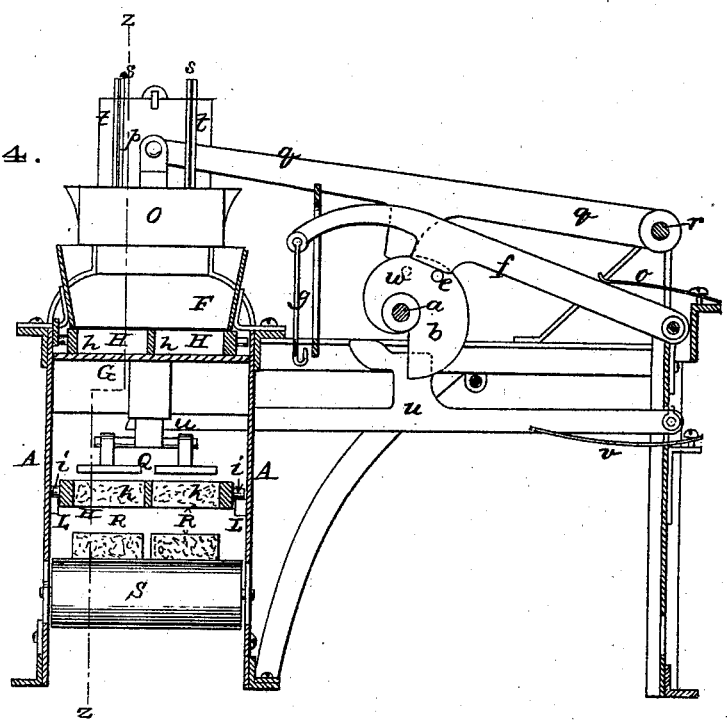
Figure 5:
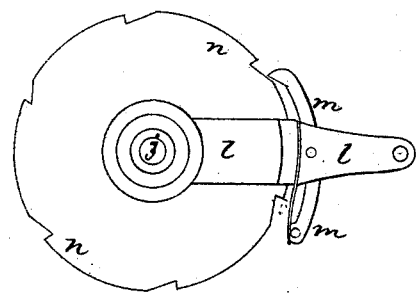
Figure 6:
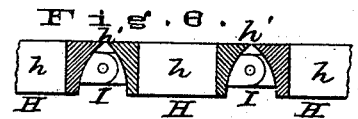
Figure 7:
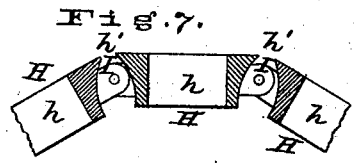

Figure 1 is a perspective view of the machine. Fig. 2 is a front elevation. Fig. 3 is a vertical section at Z Z. Fig. 4 is a vertical section transverse to the clay-trough, and passing through it and the molds. Fig. 5 is a detail in side view of the pawl and pawl-wheel, by which the molds receive motion. Figs. 6 and 7 are sections through the molds, showing the joint in different positions—as passing over the table, and as passing over the wheels J and K.

A is the main frame of the machine, and this may be of any suitable construction. B is the clay-hopper, furnished with spiked shafts $b$, to comminute the clay, and, by stirring it, cause it to descend to the discharge-aperture C at the bottom. Below the hopper, and in communication with it, is a box or horizontal passage-way, D, open at the end D', toward the molds, and closed at the other end by the feed-block E, which moves backward and forward in the box or passage D, and carries forward, at each movement, the required quantity of clay as it drops from the hopper, and ejects it from the end D' into the trough F. The bottom of this trough is formed by the smooth horizontal table G, over which the molds H pass. The table G forms the bottom of the mold-cavities $h$, said cavities being open at top to receive the clay as it falls into them from the mouth D', as they pass beneath said mouth.

The molds H are made in sections, each section having one or more brick-cavities, $h$. The sections are jointed together at the sides at I to make a continuous chain, which passes around wheels upon shafts at each end of the table, the wheels being marked J K, and their shafts $j$ $k$. $j$ is the driving-shaft of the mold-chain. The lower part of the mold-chain, or chain of molds, is supported on rails L, the joint-rods I projecting past the molds in ends $i$, which rest against the wheels J and rails L. $j'$ $j'$ are notches in the peripheries of the wheels J to receive the projecting ends $i'$ of the joint-bars I. These ends may carry anti-friction rollers, to ease their passage over the rails L, and prevent wear of ends $i$ on the rails. The wheels K support the mold-sections by direct contact with their bottoms.

The edges $h'$ of the mold-sections are made acute, so as readily to divide any lump of clay that may become interposed between them; and the edges, by coming in contact over the joints I in passing through the trough F, prevent the clay from the trough falling upon the joint I.

The clay is forced into the molds by a series of hammers of different sizes, which fall through the body of clay in the trough, and carry it down into the mold-cavities $h$ beneath.

The hammers are shown at M N O; and the intermittent motion of the molds brings each mold first beneath the hammer M, which has about one-half the section area of the mold, and the hammer descends to near the bottom of the cavity, so as to force the clay well into the corners of the mold, and to allow free escape for the air, upon all sides, between the hammer and the sides of the mold. The movements of the molds are made when the hammers are raised, and the next movement carries the mold from the hammer M to that N, and brings another mold under M. The hammer N has an area about two-thirds or three-quarters that of the mold, and may descend into the latter, say one-third of its depth, so as to fill up the main part of the cavity left by the hammer M. The next movement of the mold brings it beneath hammer O, whose face has an area greater than the mold, and which does not descend quite to the mold-top, so that a space is left all around the top of the mold for the escape of air. The continued movement of the mold carries it beneath the knife P, forming the last end of the trough F, by which all the clay above the top of the mold is shaved off, and retained in the trough. This knife may be at right angles to the movement of the molds, as shown, or it may be oblique thereto.

The filled molds are carried around until they come to the plunger Q, which, as each mold stops beneath it, descends, and forces the brick R out of the mold and onto the off-bearing belt S. This off-bearing belt or conveyer may be of any desired length, to carry the bricks any required distance.

The journal-boxes $k^1$ of the shaft $k$ have capacity for movement to adjust the tautness of the mold-chain, and this movement is accomplished by screws $k^2$.

The mechanism by which the molds, &c., are actuated will now be described.

The spiked shafts $b$ are turned by the gear-wheels $b'$, which may be driven in any suitable manner—not necessary to be described, as no novelty is claimed in this feature of the machine. The feed-block E is connected to levers T, by which it is operated, by links U, jointed to the block, and secured to the bar V, whose ends are inserted in holes in the tops of the levers. The levers may be provided with a number of bearing-holes, $T^1$, for the ends of bar V, so as to regulate the movement of the feed-block by giving the bar V bearing nearer to, or farther from, the fulcra of the levers. The supply of clay to the trough is regulated by the movement of the feed-block. The levers T have shoes $T^2$, which, as the mold-chain is moved are engaged by the projecting ends $i$ of the joint-rods I, so as to cause one forward movement of the feed-block for each movement of the molds. The backward movement of the feed-block is made by a spring, W, secured to the pivot-bar of the levers, and bearing against the projection W' of the frame.

The molds have their movement by the following means: $a$ is the main shaft of the machine, carrying snail-cams $b\ c\ d$, by which the hammers are raised. Upon the side of the cam $b$ is a lug or pin, $e$, which comes in contact with the lower side of an arm, $f$, and raises the arm once at each rotation of the cam. At the moving end of the arm $f$ is a pitman, $g$, which is connected to the free end of an arm, $l$, pivoted on the shaft $j$, and carrying a spring-pawl, $m$, engaging notches in the periphery of a wheel, $n$, on the same shaft $j$, so that each time the arm is raised the molds are moved the distance from one hammer to the next by means of the wheel J and projections $i$. The arm $f$ descends by gravity; but to assist its descent a spring, $o$, may be applied to its upper side.

The hammers M N O are connected by jointed links $p$ to the ends of the arms $q$, whose other ends are jointed at $r$ to the main frame. These arms are raised by the snail-cams $b$, $c$, and $d$, their motions being simultaneous, or nearly so, so as to admit of the movement of the molds, which movement can only take place when the hammers M and N are raised from the molds. Each hammer is attached to guide-sashes $s$ sliding vertically in a guide-frame, $t$. The hammers descend wholly by gravity.

The plunger Q, which ejects the bricks from the molds, is upon the end of an arm, $u$, which is ordinarily held up by a spring, $v$, and which is forced down to eject the bricks from the molds beneath it each time the mold-chain comes to a rest. This arm $u$ is moved down by a pin or lug, $w$, upon the side of the cam $b$, said lug coming in contact with the top of the arm $u$ at each rotation of the cam.

The backward or retrograde movement of the molds is prevented by a drop-hook, $x$, depressed by a spring, $y$, and which engages behind each projection $i$ as it passes beneath it, the hook being inclined upon the rear side, so that the projection $i$ raises it in passing beneath it.

I claim as my invention—

1. The process of molding bricks by compressing the clay in the molds by the action of hammers (as M N O) of increasing face area, substantially as set forth.

2. The combination of intermittently-moving molds H, hammers M N O, differing in face area, as described, and trough F, whose bottom G forms the bottoms of the molds while filling, substantially as set forth.

3. The combination of feed-block E, operating-levers T, provided with shoes $T^2$, and mold-chain H, having joint-rods I, provided with projecting ends, as set forth.

4. The combination of chain of molds H I, wheels J K $n$, pawl and pawl-arm $m\ l$, pitman $g$, arm $f$, and cam $b$ with lug $e$, constructed and operating substantially as set forth.

THOMAS H. BURRIDGE.

Witnesses:
SAML. KNIGHT,
ROBERT BURNS.